United States Patent
Kotani

(10) Patent No.: US 8,810,683 B2
(45) Date of Patent: Aug. 19, 2014

(54) METHOD OF CONTROLLING IMAGE CAPTURING BASED ON A DISTANCE TO AN OBJECT

(75) Inventor: Takuya Kotani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 13/470,610

(22) Filed: May 14, 2012

(65) Prior Publication Data

US 2012/0307092 A1    Dec. 6, 2012

(30) Foreign Application Priority Data

Jun. 3, 2011  (JP) .................................. 2011-125712

(51) Int. Cl.
*H04N 5/235* (2006.01)
*G03B 13/00* (2006.01)
*H04N 5/228* (2006.01)

(52) U.S. Cl.
USPC .................... 348/230.1; 348/345; 348/208.12

(58) Field of Classification Search
USPC ............... 348/208.12, 208.14, 211.11, 220.1, 348/230.1, 241, 243, 281, 333.11; 250/208.1, 208.4
See application file for complete search history.

(56) References Cited

U.S. PATENT DOCUMENTS

| | | | |
|---|---|---|---|
| 5,926,218 A * | 7/1999 | Smith ...................... | 348/207.99 |
| 6,661,500 B1 * | 12/2003 | Kindt et al. .................. | 356/5.04 |
| 7,813,577 B2 | 10/2010 | Kotani et al. | |
| 2002/0030749 A1 | 3/2002 | Nakamura et al. | |
| 2007/0064116 A1 | 3/2007 | Muraki | |
| 2007/0088488 A1 * | 4/2007 | Reeves et al. ................. | 701/117 |
| 2008/0204700 A1 * | 8/2008 | Reime .......................... | 356/5.01 |
| 2011/0310278 A1 * | 12/2011 | Bai et al. ...................... | 348/294 |

FOREIGN PATENT DOCUMENTS

| | | |
|---|---|---|
| JP | 2000-201288 A | 7/2000 |
| JP | 2009-202726 A | 9/2009 |

OTHER PUBLICATIONS

R. Ng et al., "Light Field Photography with a Hand-Held Plenoptic Camera", Stanford University Computer Science Tech Report CSTR Feb. 2005, Apr. 2005.

* cited by examiner

*Primary Examiner* — Aung S Moe
*Assistant Examiner* — Euel Cowan
(74) *Attorney, Agent, or Firm* — Fitzpatrick, Cella, Harper & Scinto

(57) ABSTRACT

An image capturing apparatus and a control method thereof relate to an image capturing apparatus such as a camera array. The image capturing apparatus comprises a plurality of image capturing units. An image capturing unit to be activated out of a plurality of image capturing units is decided based on the capturing distance of an object included in a captured scene. Electricity is supplied to the image capturing unit decided to be activated.

7 Claims, 17 Drawing Sheets

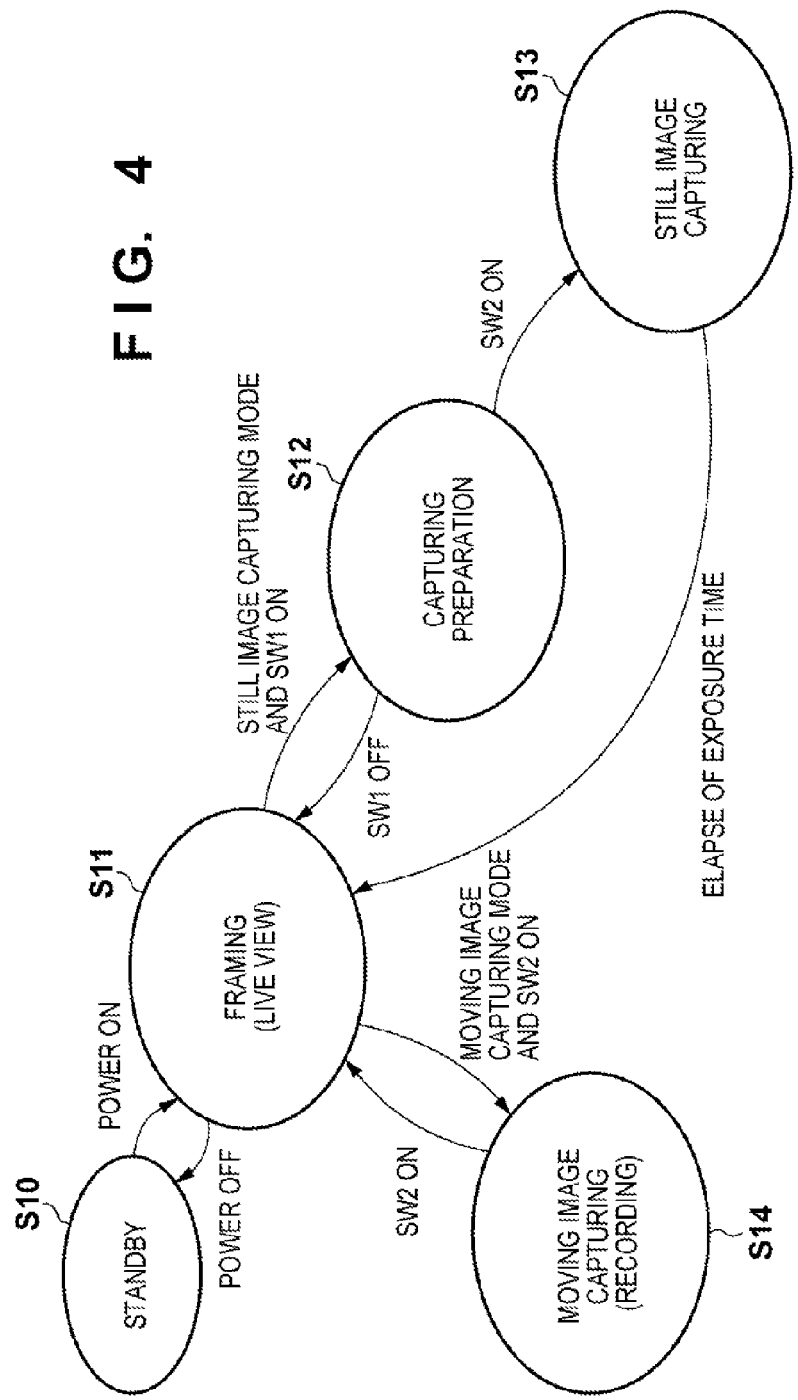

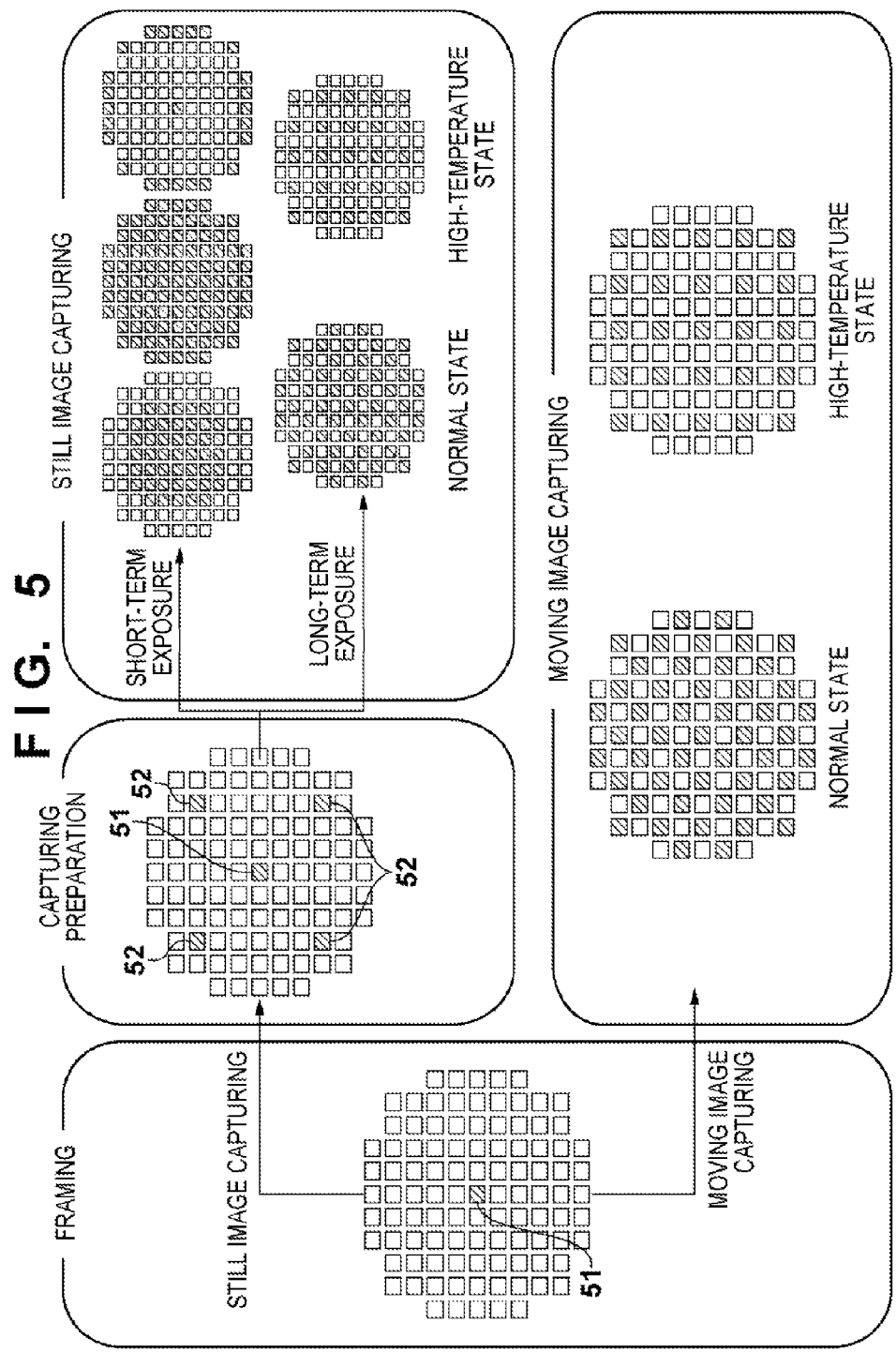

| MINIMUM OBJECT DISTANCE(m) \ GROUP | 0.1~0.13 | ~0.2 | ~5.0 | ~∞ |
|---|---|---|---|---|
| A | ACTIVE | ACTIVE | ACTIVE | INACTIVE |
| B | INACTIVE | ACTIVE | ACTIVE | INACTIVE |
| C | INACTIVE | INACTIVE | ACTIVE | ACTIVE |

F I G. 13
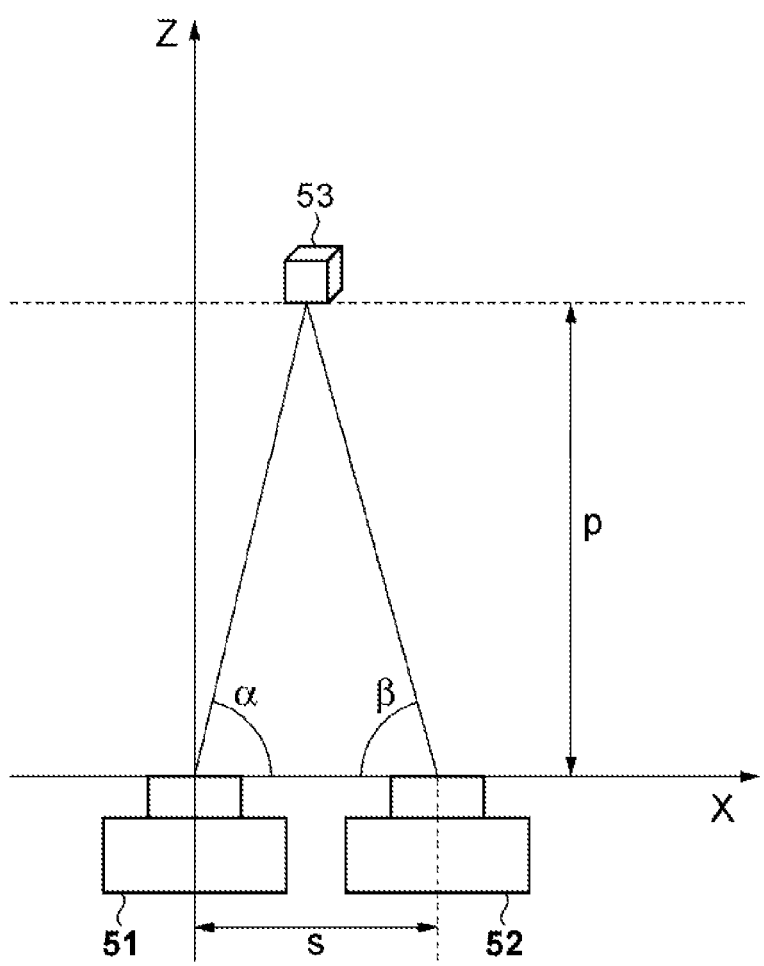

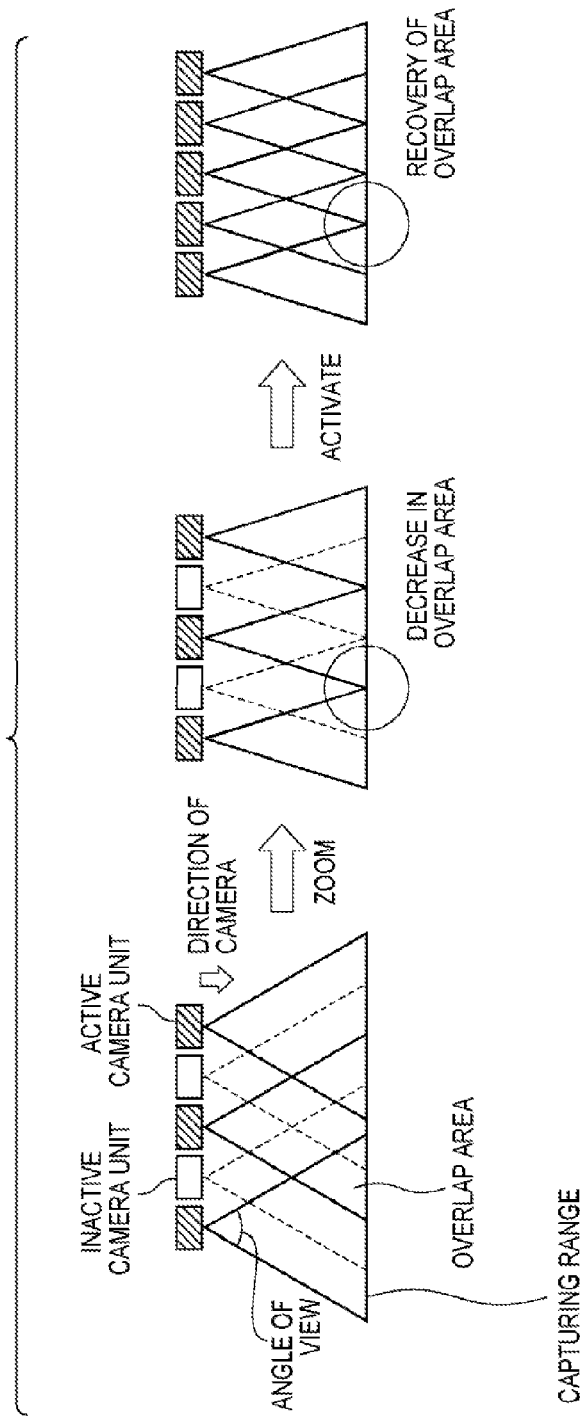

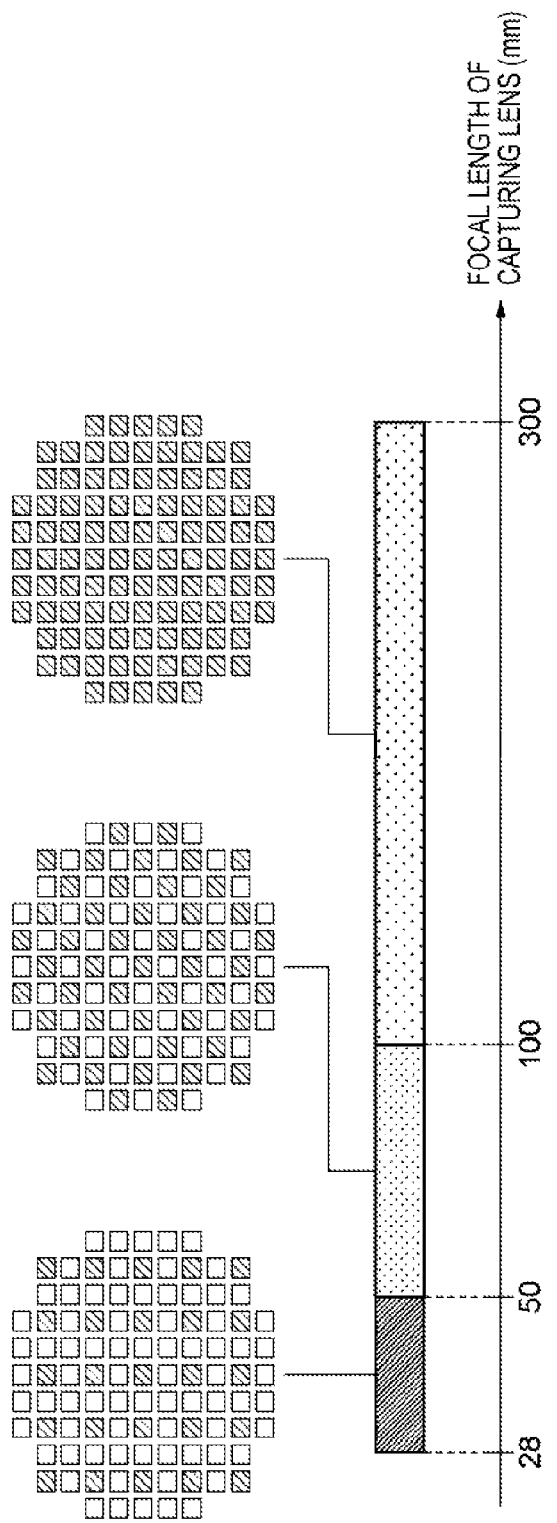

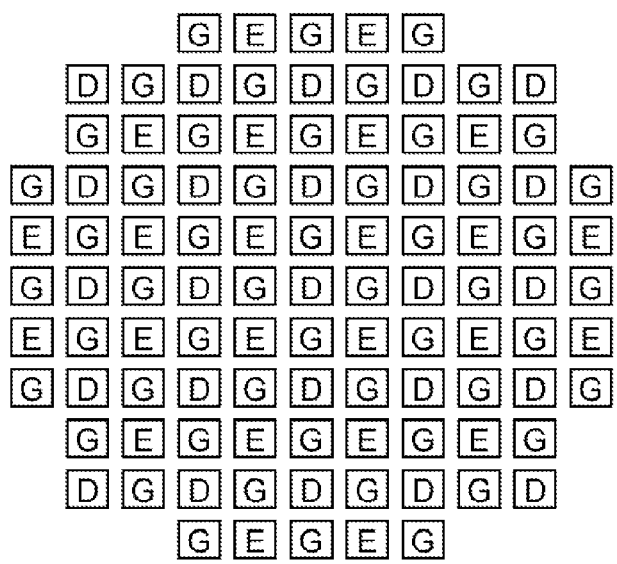

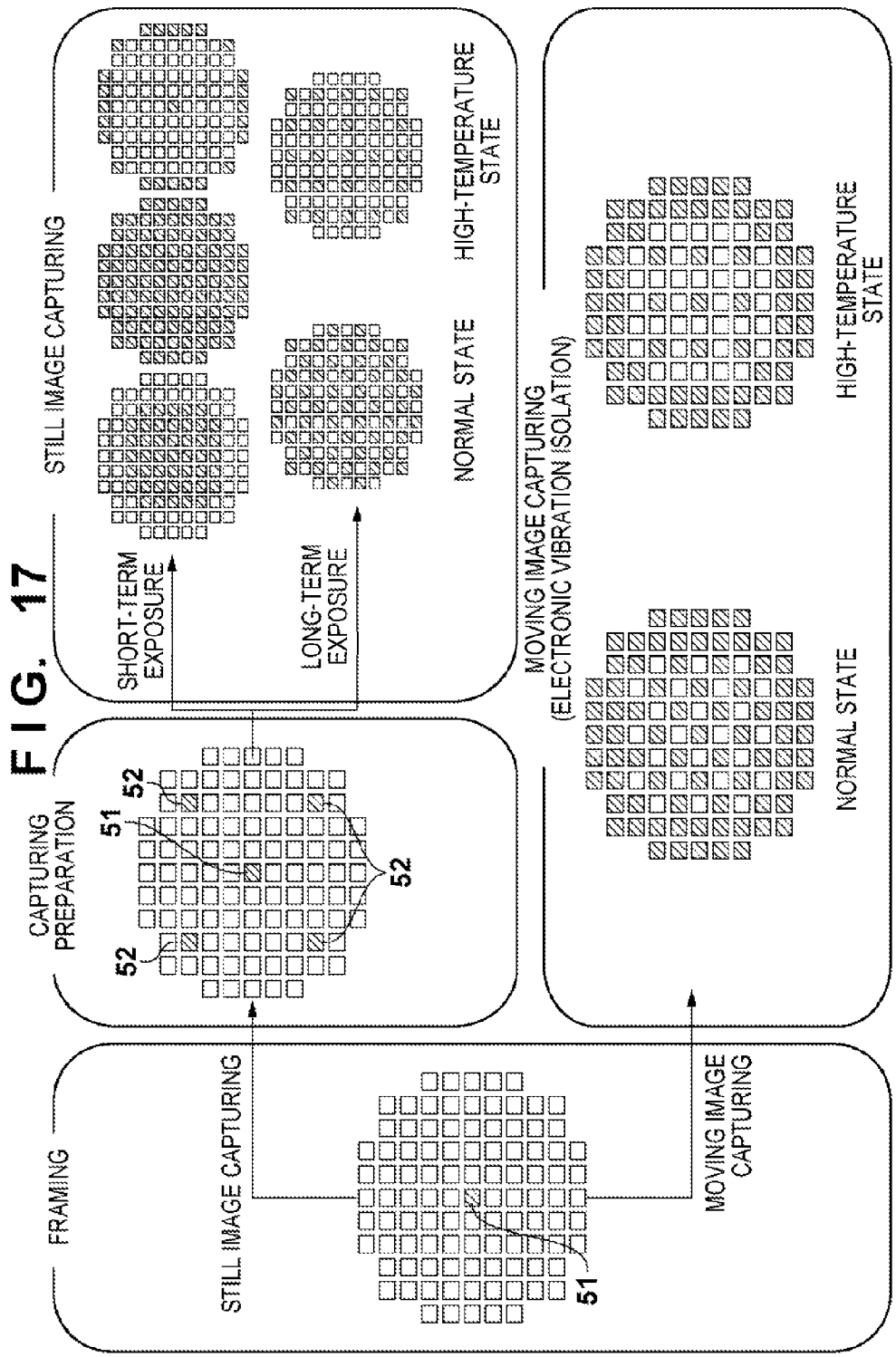

METHOD OF CONTROLLING IMAGE CAPTURING BASED ON A DISTANCE TO AN OBJECT

BACKGROUND OF THE INVENTION

1. Field of the Invention

The present invention relates to an image capturing apparatus such as a camera array and a method of controlling the same.

2. Description of the Related Art

In recent years, an attempt has been made to implement various functions, which are impossible in a single-eye camera, using images (to be referred to as multi-view images hereinafter) captured at a plurality of viewpoints. For example, there is a refocus process introduced in R. Ng, M. Levoy, et al., "Light Field Photography with a Hand-Held Plenoptic Camera", Stanford University Computer Science Tech Report CSTR 2005-02, April 2005. The refocus process is image processing of changing the capturing distance (focus) or the depth of field after image capturing and has received a great deal of attention as a technique of solving a problem of image quality such as "out-of-focus".

A plenoptic method and a camera array method are known as methods of implementing the refocus process. In the plenoptic method, a lens array is arranged in front of an imaging sensor. Light that has become incident on each lens of the lens array is recorded by a plurality of image sensors, thereby divisionally recording light that has become incident on the image capturing device. On the other hand, the camera array method divisionally records light that has become incident on a virtual image capturing device by combining a plurality of camera units.

In either method, the light that has become incident on the image capturing device is divisionally recorded for each direction. Light beams that allow to obtain a desired state are selected from the recorded light beams (light field information) and synthesized, thereby implementing various kinds of image processing represented by the refocus process. Hence, in either method, as the division (to be referred to as parallax hereinafter) of the light incident on the image capturing device becomes finer, the adjustable range can be widened, and the image quality as the processing result improves.

The plenoptic method and the camera array method are different mainly in the following three points.

(1) Output resolution: In the plenoptic method, only an output resolution almost equivalent to that of the microlens array is obtained because of the above-described structure. To the contrary, the camera array method can obtain an output resolution equivalent to the resolution of each camera unit.

(2) Fineness of parallax: A camera of the plenoptic method (to be referred to as a plenoptic camera hereinafter) obtains light field information of small parallax divided by the lenses included in the lens array. However, the parallax of a camera of the camera array method (to be referred to as a camera array hereinafter) depends on the distance (base-line length) between the camera units, and it is therefore difficult to obtain a small parallax. Hence, in the camera array method, the camera units are arranged as densely as possible to minimize the base-line length.

(3) Power consumption: The plenoptic camera adds a lens array in front of the imaging sensor of a general digital camera and has a power consumption equal to that of the digital camera of the base. To the contrary, the camera array includes a number of camera units, and its power consumption increases in accordance with the number of camera units.

Concerning the problem of power consumption of the camera array, a technique of cutting power supply to some components to reduce the power consumption has been proposed in the field of security cameras. There exists, for example, a technique of controlling power supply to the camera or an illumination device in accordance with a person detection result in a specific area.

However, the camera array has not only the problem of power consumption but also the problem of thermal noise generated by the densely arranged camera units. In the camera array, the camera units need to be arranged densely due to the above-described reason. Each camera unit is affected by heat from the camera units arranged in the periphery, and the thermal noise increases.

It is the image quality of the camera unit (to be referred to as a center camera unit hereinafter) arranged near the center of the camera array that most affects the quality of an image obtained by the camera array. However, since many camera units are arranged around the center camera unit, the thermal noise of the center camera unit tends to increase. In other words, it is important in the camera array to obtain light field information as much as possible while suppressing the thermal noise.

SUMMARY OF THE INVENTION

In one aspect, an image capturing apparatus comprising: a plurality of image capturing units; a decision unit configured to decide an image capturing unit to be activated out of the plurality of image capturing units based on a capturing distance of an object included in a captured scene; and a supply unit configured to supply electricity to the image capturing unit decided to be activated.

According to the aspect, it is possible to suppress thermal noise by controlling the active/inactive states of a plurality of image capturing units included in an image capturing apparatus.

Further features of the present invention will become apparent from the following description of exemplary embodiments with reference to the attached drawings.

BRIEF DESCRIPTION OF THE DRAWINGS

FIG. 4 is a state transition diagram for explaining the state transition of the camera array.

FIG. 5 is a view for explaining an active camera unit decision method.

FIG. 13 is a view for explaining distance calculation.

FIG. 14 is a view for explaining active camera unit switching corresponding to a zooming operation.

FIG. 15 is a view for explaining a state in which the active camera units are switched based on the focal length of a capturing lens.

FIGS. 16A and 16B are views for explaining group management of the camera units for the zooming operation.

FIG. 17 is a view for explaining an active camera unit decision method considering electronic vibration isolation.

DESCRIPTION OF THE EMBODIMENTS

An image capturing apparatus according to an embodiment of the present invention and a method of controlling the same will now be described in detail with reference to the accompanying drawings.

[Schematic Arrangement of Apparatus]

The schematic arrangement of a multi-view camera (to be referred to as a camera array hereinafter) of a camera array method according to an embodiment will be described with reference to the perspective views of FIGS. 1A and 1B.

Figure 1A:
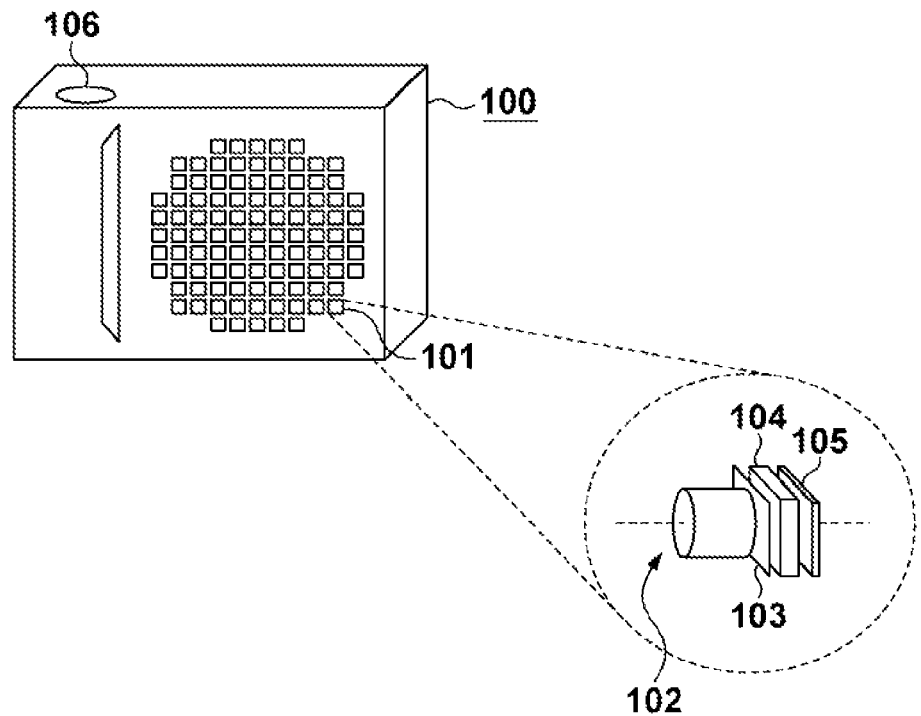
FIGS. 1A and 1B are perspective views for explaining the schematic arrangement of a multi-view camera according to an embodiment.

As shown in FIG. 1A, a camera array formed by arranging a plurality of camera units 101 is arranged in front of a camera array 100. A release button 106 to instruct the start of image capturing is arranged on the upper surface. Each of the camera units 101 includes a capturing lens 102, an optical filter 103, an image capturing device 104, and a peripheral circuit 105. Performing simultaneous capturing using the camera array allows to obtain multi-view images.

Figure 1B:
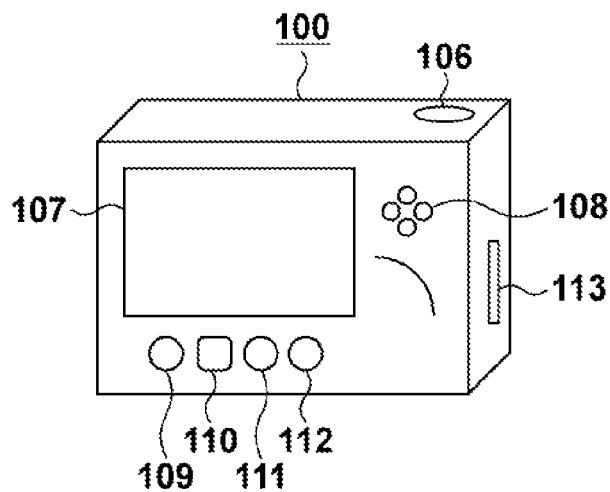

As shown in FIG. 1B, a memory card slot 113 for receiving a recording medium such as a semiconductor memory card is arranged in a side surface of the camera array 100. Instead of arranging the memory card slot 113, a serial bus interface such as a USB (Universal Serial Bus) may be arranged to connect a storage device such as a hard disk drive via the serial bus.

A display unit 107, keys 108 arranged in a cross pattern, a power button 109, a menu button 110, an enter button 111, a cancel button 112, and the like are arranged on the rear surface of the camera array 100.

Note that the camera array 100 of this embodiment includes no optical viewfinder. An image displayed on the display unit 107 is used for a framing operation (focus and composition check). Live view display for displaying a capturing range in real time, camera setting menu display upon pressing the menu button 110, and the like are done on the display screen of the display unit 107. Note that when the user presses the menu button 110 in a state in which the camera setting menu is displayed, the display screen of the display unit 107 restores the live view display.

In the state in which the camera setting menu is displayed, the user selects a set item, changes the state of the selected set item by operating the keys 108, and decides the change by pressing the enter button 111 or cancels the change by pressing the cancel button 112. Examples of the set items changeable by the camera setting menu are the capturing mode such as moving image capturing/still image capturing to be switched, the stop number, and the shutter speed.

In the following explanation, the stop number, the shutter speed, and the zooming position are set to the same values in the camera units 101 included in the camera array. However, different values may be set in the camera units 101. As for the capturing distance, for example, the distance to an object corresponding to an automatic focus (AF) distance measurement frame designated by operating the touch screen of the display unit 107 or the keys 108 is calculated, and the calculated distance is set as the capturing distance for all the camera units 101. Note that details of object distance estimation processing will be described later.

[Arrangement of Apparatus]

Figure 2:
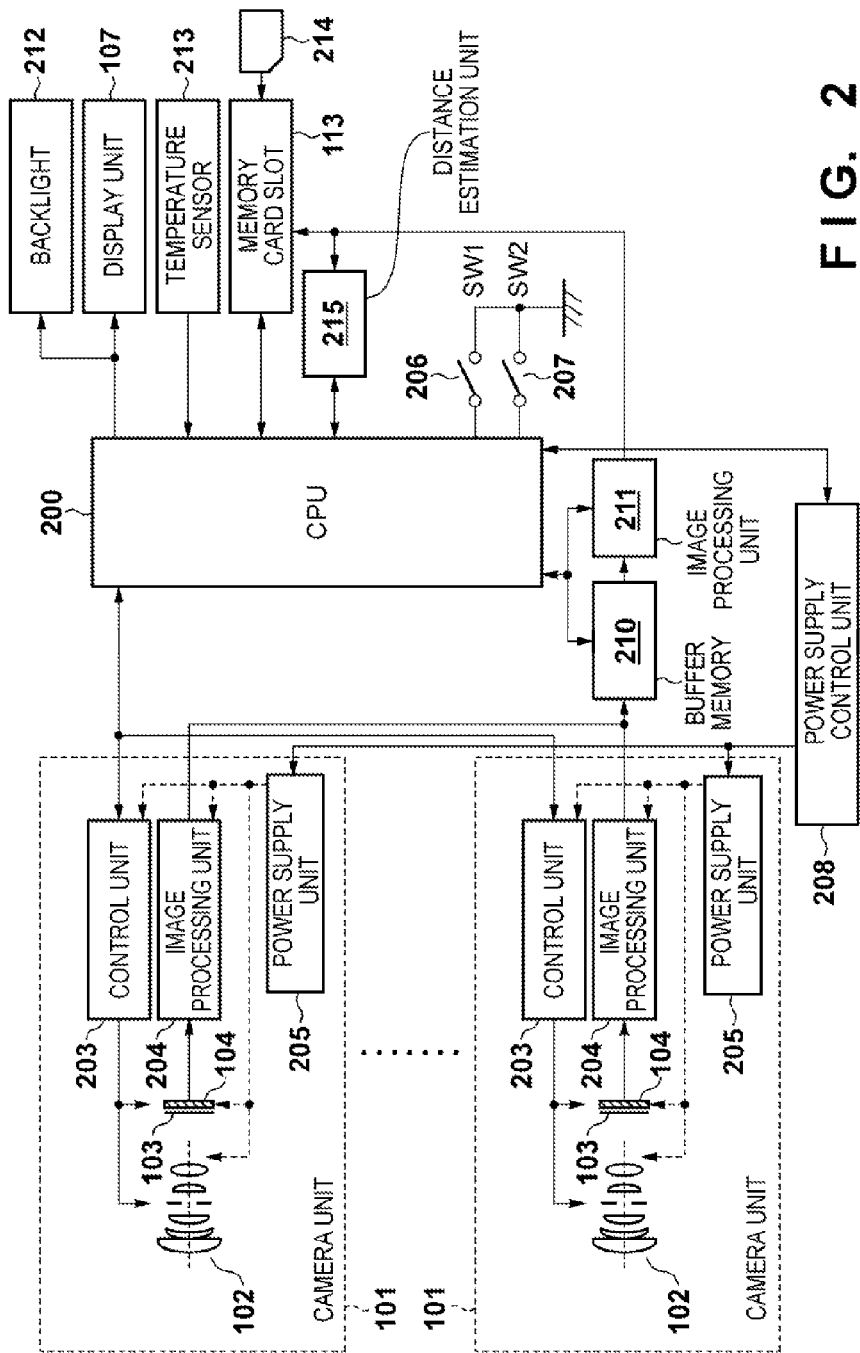
FIG. 2 is a block diagram for explaining the arrangement of a camera array according to the embodiment.

The arrangement of the camera array according to the embodiment will be described with reference to the block diagram of FIG. 2.

A one-chip microprocessor (CPU) 200 executes a control program stored in an internal read only memory (ROM) or the like to process image data output from each camera unit 101, and also controls the operation of the entire camera array 100 by controlling components to be described later. The control target of the CPU 200 includes display on the display unit 107 such as a liquid crystal display panel (LCD), the backlight of the display unit 107, and the power supply of each camera unit 101.

The functions of a switch 206 (SW1) and a switch 207 (SW2) change depending on the capturing mode. When the camera array 100 is in the still image capturing mode, the switch SW1 is turned on in a state (halfway pressing state) in which the release button 106 is pressed halfway. When the switch SW1 is turned on, the camera array 100 is set in a capturing preparation state. The switch SW2 is turned on in a state (full pressing state) in which the release button 106 is pressed completely. When the switch SW2 is turned on, the camera array 100 starts capturing a still image. After the elapse of an exposure time decided in the capturing preparation state, the camera array 100 ends capturing the still image and stores the captured still image in, for example, a recording medium 214 inserted in the memory card slot 113.

When the camera array is in the moving image capturing mode, the switch SW1 does not function. The switch SW2 is turned on in the full pressing state of the release button 106. The camera array 100 starts capturing (recording) a moving image when the switch SW2 is turned on. After the start of moving image capturing, when the switch SW2 is temporarily turned off and then on again, the camera array 100 stops capturing the moving image and stores the captured moving image in, for example, the recording medium 214 inserted in the memory card slot 113. Note that the angle of view of the capturing lens 102 can be changed by a zooming operation during moving image capturing.

Each camera unit 101 includes the capturing lens 102, the optical filter 103, the image capturing device 104, and the peripheral circuit 105. The peripheral circuit 105 includes a control unit 203, an image processing unit 204, and a power supply unit 205 of the camera unit 101.

The control unit 203 performs shutter control and various kinds of control of the capturing lens 102. For example, the control unit 203 performs capturing distance control to drive the capturing lens 102 in accordance with the capturing distance, aperture control to drive the diaphragm in the capturing lens 102 in accordance with the stop number, and shutter control to drive the image capturing device 104 in accordance with the exposure time. The image processing unit 204 processes an image signal output from the image capturing device 104 and transfers the resultant image data to a buffer memory 210. An image processing unit 211 generates image data corresponding to the format of image data to be stored in the recording medium 214 using the image data stored in the buffer memory 210.

A power supply control unit 208 controls the power supply unit 205 of each camera unit 101 based on the state of the camera array 100, and details will be described later.

[Arrangement of Camera Units]

FIGS. 3A to 3D illustrate examples of the arrangement of the camera units 101. Referring to FIGS. 3A to 3D, a rectangle represents each camera unit 101. An array of rectangles represents an example of the arrangement of the camera units 101 when the camera array 100 is viewed from the front. The arrangement patterns of the camera units 101 as shown in FIGS. 3A to 3D are possible. The following description will be done assuming that the camera units 101 of the camera array 100 are arranged in the arrangement pattern shown in FIG. 3A.

[State Transition]

The state transition of the camera array 100 will be described with reference to the state transition diagram of FIG. 4. The operation state of the camera array 100 transits between a standby state S10 and a live view state S11 as the power button 109 is operated.

The still image capturing mode generally includes composition adjustment (framing state S11), a capturing preparation state S12 (focusing and exposure decision), and a still image capturing state S13. An image is acquired by a sequence that undergoes the three states. The still image capturing state S13 is roughly divided into short-term exposure with an exposure time less than several sec and long-term exposure with an exposure time as long as several min.

On the other hand, in the moving image capturing mode, moving image data is often acquired by a sequence that starts recording from the live view state S11, transits to a moving image capturing state S14, and then ends the recording and returns to the live view state S11. In this sequence, the length of the exposure time cannot be determined at the start of moving image capturing.

In this embodiment, different power supply control methods are employed for the capturing modes and operation states obtained by combining the four, framing, capturing preparation, short-term exposure still image capturing, and long-term exposure still image capturing (or moving image capturing) states.

In the following explanation, the camera units 101 to be activated by supplying electricity will be referred to as "active camera units", and the camera units 101 other than the active camera units, which are set in a power saving mode, will be referred to as "inactive camera units". No electricity is supplied to the image capturing device 104 and the main units (the control unit 203 and the image processing unit 204) of the peripheral circuit 105 of each inactive camera unit. Alternatively, the power supply is suppressed to the minimum. As a result, only image data output from the active camera units are transferred to the buffer memory 210.

[Active Camera Unit Decision]

An active camera unit decision method will be described with reference to FIG. 5.

Figure 3A:
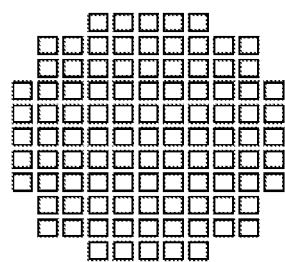
FIGS. 3A to 3D are views showing examples of the arrangement of camera units.
Figure 3B:
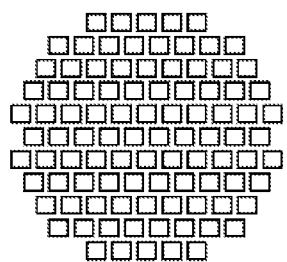
Figure 3C:
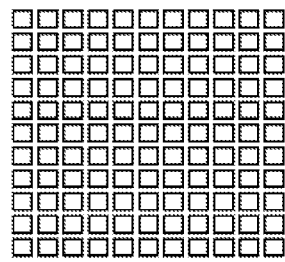
Figure 3D:
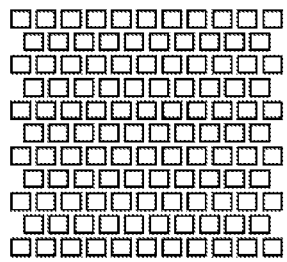

Referring to FIG. 5, a rectangle and an array of rectangles represent each camera unit 101 and the arrangement of the camera units, respectively, as in FIG. 3A. A hollow rectangle represents an inactive camera unit, and a hatched rectangle represents an active camera unit. Reference numeral 51 denotes a center camera unit; and 52, examples of camera units for distance estimation. The active camera units are decided in the following way.

Guideline 1 (short-term exposure still image capturing): The active camera units are decided based on the distance (to be referred to as a minimum object distance hereinafter) between the camera array 100 and an object closest to the camera array 100 out of the objects included in the captured scene. Note that the distance estimation is executed in the capturing preparation state S12.

Guideline 2 (long-term exposure still image capturing or moving image capturing): The camera units 101 arranged adjacent to each other are not simultaneously used as the active camera units. In addition, the number of active camera units is reduced in accordance with the body temperature of the camera array 100.

Figure 6:
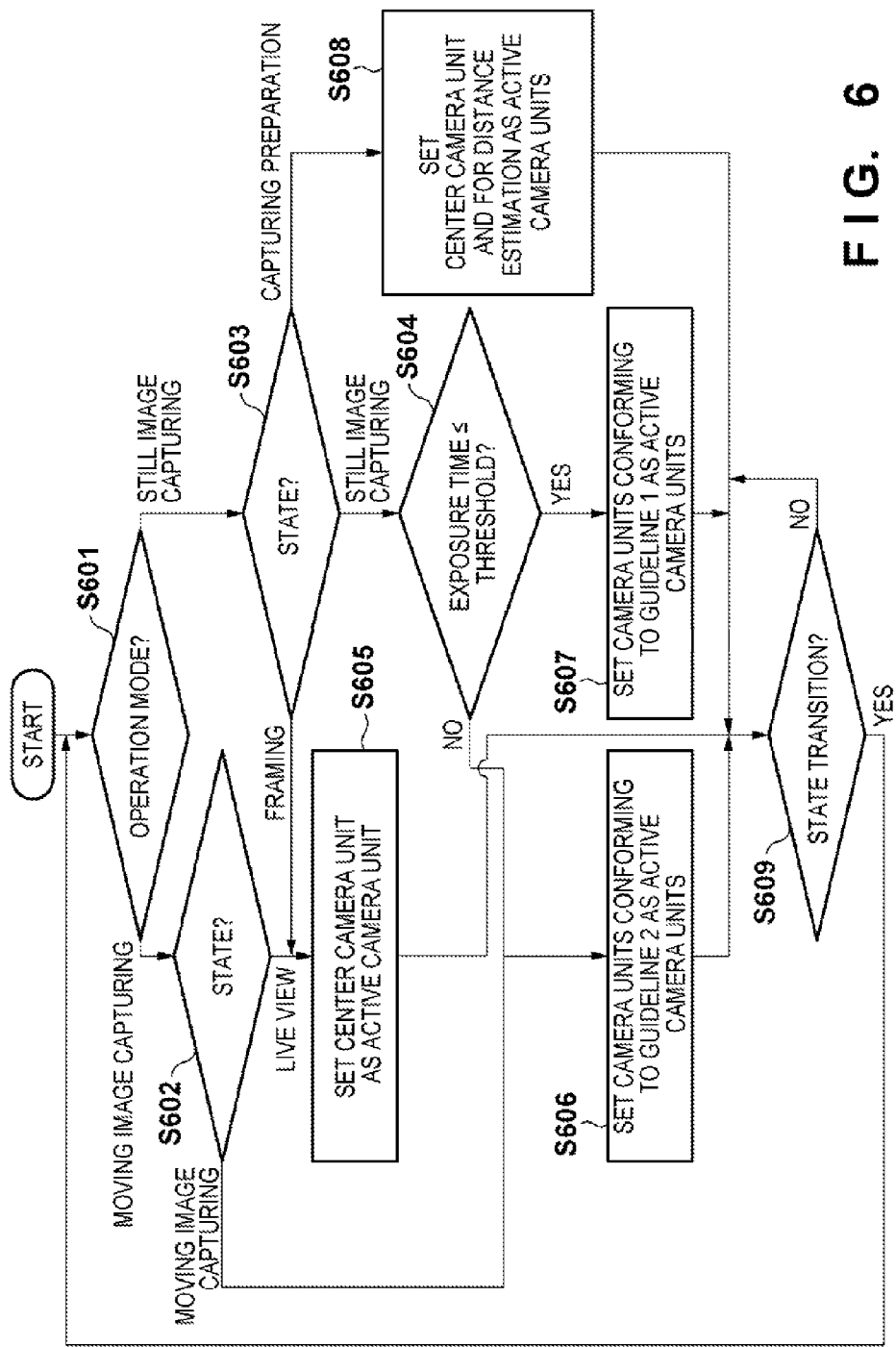
FIG. 6 is a flowchart for explaining active camera unit decision processing based on examples of guidelines.

Active camera unit decision processing based on the examples of guidelines will be described with reference to the flowchart of FIG. 6. Note that the CPU 200 determines the operation state of the camera array 100 by determining the operation mode and the value of a status flag corresponding to the capturing sequence.

The CPU 200 determines the operation mode of the camera array 100 (step S601). In the moving image capturing mode, the CPU 200 determines whether the camera array 100 is in the live view state S11 or the moving image capturing state S14 (step S602). If the camera array 100 is in the live view state S11, only the center camera unit 51 is set as the active camera unit (step S605). If the camera array 100 is in the moving image capturing state, the camera units 101 conforming to guideline 2 are set as the active camera units (step S606).

On the other hand, in the still image capturing mode, the CPU 200 determines in which one of the live view or framing state S11, the capturing preparation state S12, and the still image capturing state S13 the camera array 100 is set (step S603). If the camera array 100 is in the live view or framing state S11, only the center camera unit 51 is set as the active camera unit (step S605). If the camera array 100 is in the capturing preparation state S12, the center camera unit 51 and the camera units 52 for distance estimation, which are some of the camera units 101, are set as the active camera units (step S608).

If the camera array 100 is in the still image capturing state S13, the CPU 200 determines the length of the exposure time (step S604). If the exposure time is equal to or shorter than a threshold (for example, 3 sec), the CPU determines that the mode is short-term exposure still image capturing and sets the camera units 101 conforming to guideline 1 as the active camera units (step S607). If the exposure time exceeds the threshold, the CPU determines that the mode is long-term exposure still image capturing and sets the camera units 101 conforming to guideline 2 as the active camera units (step S606).

The CPU 200 then determines whether the state of the camera array 100 has transited (step S609). When the state has transited, the process returns to step S601.

Details of the active camera unit decision method will be described below.

Framing (Live View) State

In the framing (live view) state S11, the CPU 200 sets only the center camera unit 51 as the active camera unit and displays an image represented by image data acquired by the center camera unit 51 on the display unit 107. This makes it possible to display a live view image with little delay because the power consumption is low, and no complex processing is necessary.

Capturing Preparation State

Figure 7:
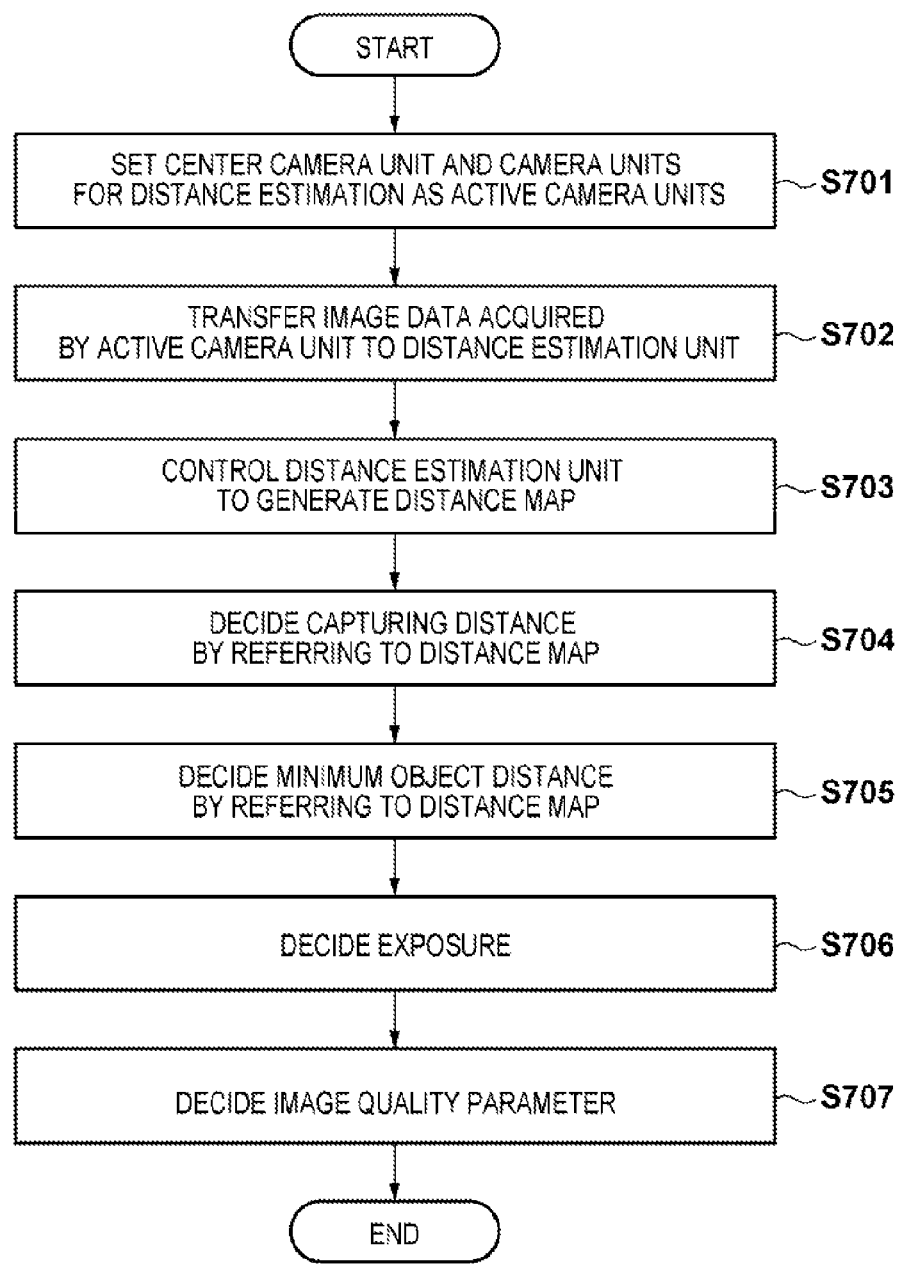
FIG. 7 is a flowchart for explaining processing in a capturing preparation state.

In the capturing preparation state S12, the CPU 200 sets the capturing distance, white balance, and exposure and estimates the minimum object distance. Processing in the capturing preparation state S12 will be described with reference to the flowchart of FIG. 7.

The CPU 200 sets the center camera unit 51 and the camera units 52 for distance estimation as the active camera units (step S701). Image data acquired by the active camera units are transferred to a distance estimation unit 215 via the buffer memory 210 and the image processing unit 211 (step S702).

The CPU 200 controls the distance estimation unit 215 to generate a distance map estimated from the image data acquired by the active camera units (step S703). The CPU 200 decides the capturing distance to be set in the active camera units by referring to the distance map (step S704) and decides the minimum object distance necessary for short-term capturing (step S705). The CPU 200 also decides the exposure (for example, the shutter speed and the stop number) (step S706) and decides the image quality parameter (for example, white balance) (step S707).

Figure 8:
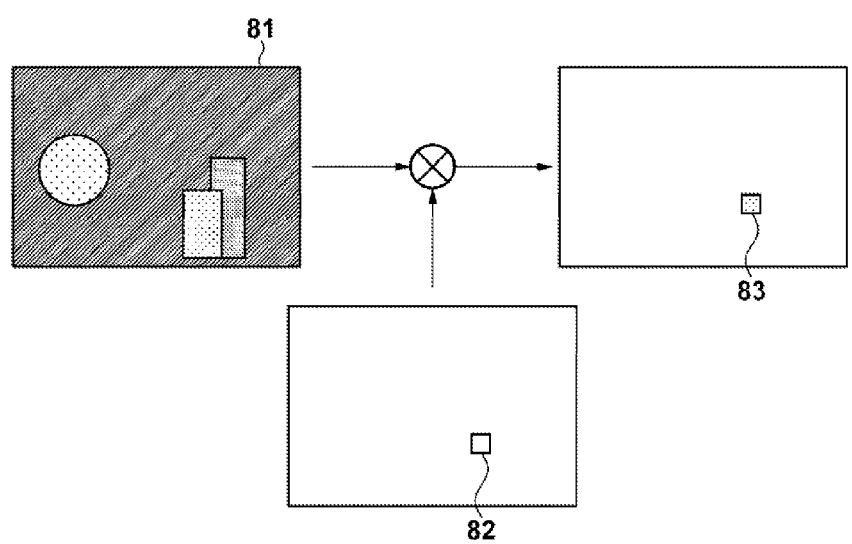
FIG. 8 is a view for explaining capturing distance decision.

Capturing distance decision will be described with reference to FIG. 8. The CPU 200 overlays an AF distance measurement frame 82 designated by the user on a distance map 81, extracts a region 83 corresponding to the AF distance measurement frame 82, and decides the capturing distance using the distance information in the region 83. For example, the average value of the distance information in the region 83 corresponding to the AF distance measurement frame 82 is decided as the capturing distance. The CPU 200 also acquires the minimum distance from the distance map 81 and sets it to the minimum object distance.

Still Image Capturing State

In the still image capturing state S13, the CPU 200 decides the active camera units in accordance with the exposure time decided in the capturing preparation state S12. For long-term exposure, the active camera units are decided in accordance with the same procedure as in the moving image capturing state S14 to be described later. For short-term exposure, the active camera units are switched based on the minimum object distance.

A state in which the active camera units are switched based on the minimum object distance will be described with reference to FIG. 9. Note that FIG. 9 shows an example in which the minimum capturing distance of the camera units 101 is 0.1 m.

When the objects exist in the immediate vicinity of the camera array 100, for example, at a distance of about 10 cm, the parallax to the object between the center camera unit 51 and the camera units (to be referred to as outer camera units hereinafter) arranged at the periphery is large. In addition, the main object may fall outside the capturing range covered by the outer camera units.

Figure 9:
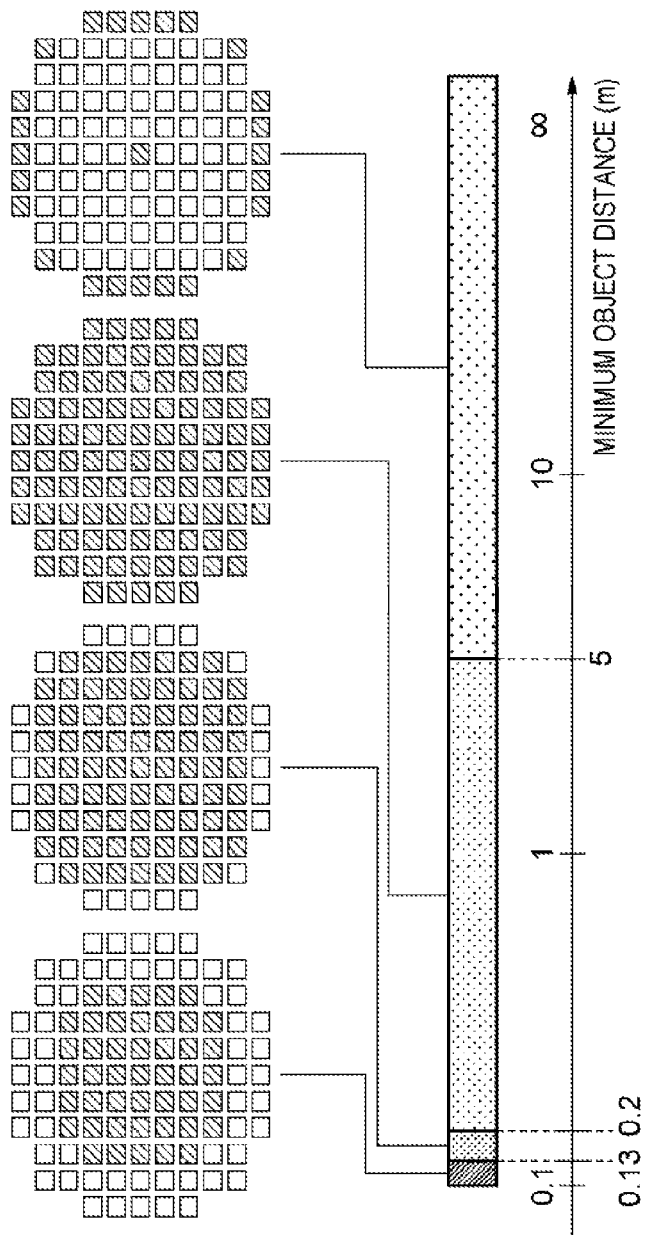
FIG. 9 is a view for explaining a state in which the active camera units are switched based on the minimum object distance.

As shown in FIG. 9, when the minimum object distance is short, the outer camera units are set as the inactive camera units. In the example of FIG. 9, the outer camera units are inactivated stepwise so that the outer camera units are set as the inactive camera units when the minimum object distance is 0.1 to 0.13 m, and the outermost camera units are set as the inactive camera units when the minimum object distance is 0.13 to 0.2 m.

Conversely, when the objects included in the captured scene exist only in a place sufficiently spaced apart from the camera array 100 (for example, 5 m or more), the parallax obtained by the plurality of camera units 101 is very small. In other words, the parallax between the center camera unit 51 and the camera units around it is very small, and image data acquisition by the peripheral camera units is meaningless. In this case, the center camera unit 51 and the outermost camera units are set as the active camera units, as shown in FIG. 9. In the example of FIG. 9, all camera units are set as the active camera units when the minimum object distance is 0.2 to 5 m.

Figures 10A, 10B:
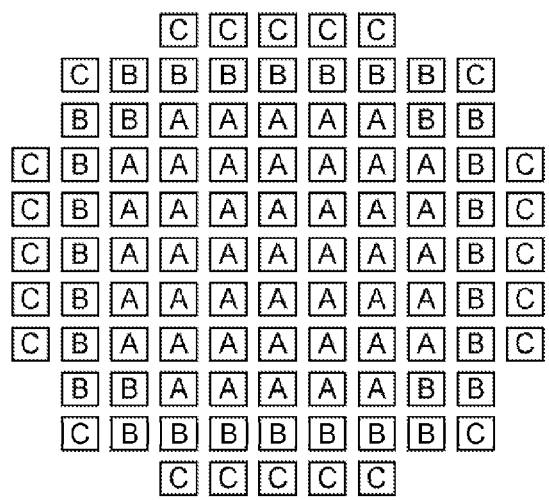
FIGS. 10A and 10B are views for explaining group management of the camera units.

Group management of the camera units will be described with reference to FIGS. 10A and 10B. As shown in the example of FIG. 10A, the camera units 101 are divided into a group A of camera units arranged at the central portion and groups B and C of camera units arranged at the outer portion. The camera units arranged at the outermost portion are particularly put into the group C.

FIG. 10B is a table showing activation/inactivation of the groups. The power supply control unit 208 controls the operation of the power supply unit 205 of each camera unit 101 based on an instruction and the minimum object distance input from the CPU 200 and the table shown in FIG. 10B.

Thus switching the active camera units based on the minimum object distance allows not only to reduce the power consumption but also to appropriately reduce the image data amount.

Moving Image Capturing State (Long-Term Exposure)

In the moving image capturing state S14, the probability that long-term exposure is performed is high. Hence, in a normal state, the active camera units are arranged in a checkerboard pattern not to simultaneously activate camera units adjacent to each other (to be referred to as normal setting hereinafter), as shown in FIG. 5. This arrangement enables to reduce the influence of heat generation of adjacent camera units and acquire a sufficient parallax image.

In the moving image capturing state S14, the capturing time may continuously become very long. In addition, next moving image capturing may start before the body temperature of the camera array 100 that has become hot during the long-term continuous capturing lowers. Hence, an active camera unit arrangement for a high temperature is prepared for a case of high body temperature (for example, 40° C. or more) (to be referred to as high-temperature setting hereinafter), as shown in FIG. 5. That is, the power supply control unit 208 has the active camera unit arrangement pattern for the normal state and that for a high temperature shown in FIG. 5, and switches the arrangement pattern in accordance with an instruction from the CPU 200.

Figure 11:
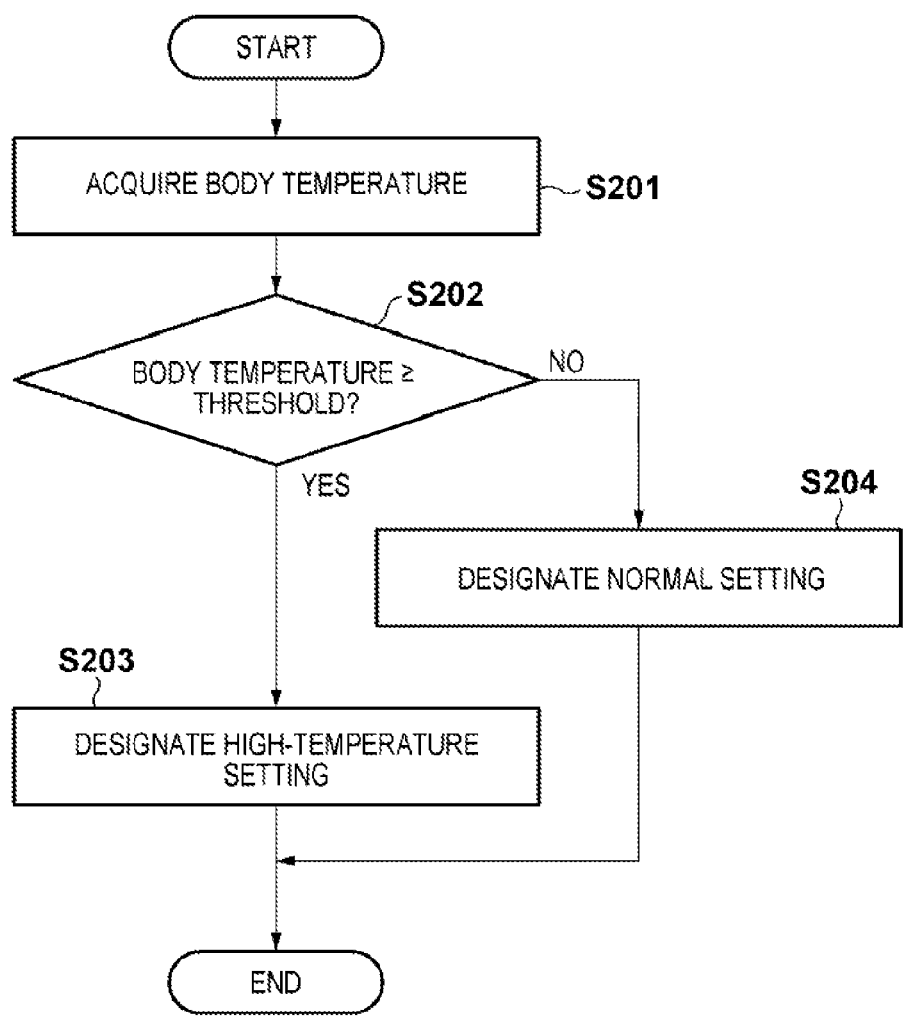
FIG. 11 is a flowchart for explaining an active camera unit arrangement decision method in a moving image capturing state.

The active camera unit arrangement decision method in the moving image capturing state S14 will be described with reference to the flowchart of FIG. 11. The CPU 200 acquires the temperature from a temperature sensor 213 arranged at an appropriate portion of the body of the camera array 100 (step S201) and determines whether the acquired temperature is equal to or higher than a threshold (for example, 40° C.) (step S202). If the temperature is equal to or higher than the threshold, the CPU 200 instructs the power supply control unit 208 to do high-temperature setting (step S203). If the temperature is lower than the threshold, the CPU 200 instructs the power supply control unit 208 to do normal setting (step S204).

Note that the CPU may acquire not the body temperature but the temperature of, for example, the image capturing device 104 of each camera unit 101 and decide the active camera unit arrangement pattern based on, for example, the average value or weighted average value of the temperatures of the image capturing devices 104. The weights are set so as to, for example, become large from the peripheral portion to the center. The active camera unit arrangement pattern may be decided based on the remaining level of the battery (not shown) of the camera array 100.

[Distance Estimation Processing]

Figure 12:
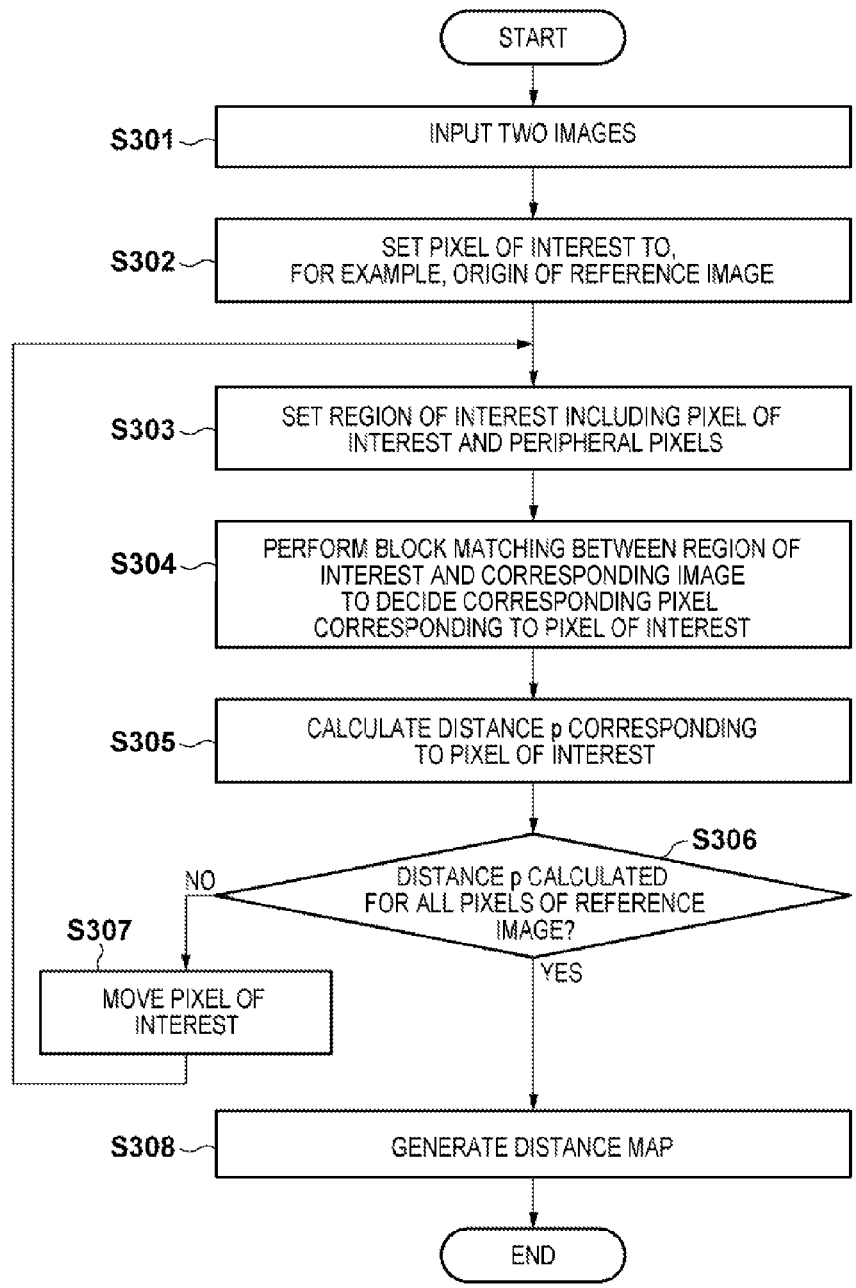
FIG. 12 is a flowchart for explaining distance estimation processing.

In distance estimation processing, the distance of a captured scene is estimated based on multi-view images captured by the camera array 100 to generate a distance map (depth image). A stereo method, a multi-baseline stereo method, or the like is usable as the distance estimation method. In this embodiment, distance estimation is performed using the stereo method. The distance estimation processing will be described with reference to the flowchart of FIG. 12.

The distance estimation unit 215 receives two images selected by the CPU 200 from multi-view images (step S301).

For example, the CPU 200 selects an image (to be referred to as a reference image hereinafter) captured by the center camera unit 51 and an image (to be referred to as a non-reference image hereinafter) captured by an arbitrary one of the camera units 52 for distance estimation as the two images to be used to estimate the distance.

Next, the distance estimation unit 215 sets the pixel of interest at, for example, the origin of the reference image (step S302) and sets a region of interest including the pixel of interest and peripheral pixels (step S303). Block matching is performed between the region of interest and the non-reference image, thereby deciding a pixel (corresponding pixel) of the non-reference image corresponding to the pixel of interest (step S304).

The distance estimation unit 215 then calculates a distance p corresponding to the pixel of interest based on image capturing apparatus information representing the angle of view of the camera unit 52 that has captured the non-reference image and the relative position with respect to the center camera unit 51, the pixel of interest, and the corresponding pixel (step S305).

Calculation of the distance p will be explained with reference to FIG. 13. An angle α is calculated from the horizontal angle of view of the center camera unit 51, the capturing position of the reference image, and the coordinates of the pixel of interest. An angle β is calculated from the horizontal angle of view of the camera unit 52 for distance estimation, the capturing position of the non-reference image, and the coordinates of the corresponding pixel. A distance s is the distance between the center camera unit 51 and the camera unit 52 and is calculated from the capturing positions of the reference image and the non-reference image. The distance p from an object 53 is calculated by $$p = \{\sin \alpha \cdot \sin \beta / \sin(\pi - \alpha - \beta)\} s \quad (1)$$

The distance estimation unit 215 determines whether the distances p corresponding to all pixels of the reference image have been calculated (step S306). If an uncalculated pixel remains, the pixel of interest is moved (step S307), and the process returns to step S303. If the distances p corresponding to all pixels of the reference image have been calculated, a distance map is generated by associating the distances p corresponding to all pixels with the pixel values (step S308).

[Zooming Operation]

Active camera unit switching corresponding to a zooming operation will be described with reference to FIG. 14.

In the high-temperature setting at the time of moving image capturing or long-term exposure still image capturing, the active camera units are thinned out. When the angle of view is narrowed by the zooming operation in this state, the overlap area of the capturing ranges of the camera units may be smaller, as shown in FIG. 14, and it may be impossible to obtain a sufficient parallax. Hence, when the camera array 100 has the zooming function, the arrangement of the active camera units is preferably controlled in accordance with the angle of view.

A state in which the active camera units are switched based on the focal length of the capturing lens 102 will be described with reference to FIG. 15. Note that FIG. 15 shows an example in which the focal length of the capturing lens 102 ranges from 28 mm to 300 mm (converted for 35 mm).

That is, the arrangement pattern in the high-temperature setting is used for a focal length of 28 to 50 mm, the arrangement pattern in the normal state is used for a focal length of 50 to 100 mm, and all camera units are activated for a focal length more than 100 mm.

Group management of the camera units for the zooming operation will be described with reference to FIGS. 16A and 16B. As shown in the example of FIG. 16A, the camera units 101 are divided into groups D, E, and G in a checkerboard pattern. FIG. 16B is a table showing the focal lengths and activation/inactivation of the groups in the normal state and in the high-temperature state. The power supply control unit 208 controls the operation of the power supply unit 205 of each camera unit 101 based on an instruction and the focal length input from the CPU 200 and the table shown in FIG. 16B.

Thus switching the active camera units based on the focal length allows to appropriately cope with the problem of the decrease in the overlap area between the capturing ranges upon the zooming operation.

[Electronic Vibration Isolation]

Active camera unit switching based on activation/inactivation of electronic vibration isolation used in moving image capturing will be described below.

Electronic vibration isolation is a technique of acquiring a video that is apparently free from vibration by aligning frames to reduce the difference between them and cutting the non-overlap image portions between the frames. Since vibration is suppressed by such a mechanism, an image needs to be acquired in an angle of view wider than that of the region to originally be captured when performing the electronic vibration isolation processing.

An active camera unit decision method considering electronic vibration isolation will be described with reference to FIG. 17. As shown in FIG. 17, when performing electronic vibration isolation processing, the outer camera units (the groups B and C shown in FIG. 10A) are set as the active camera units. That is, the CPU 200 determines the electronic vibration isolation processing set state. If execution of the electronic vibration isolation processing is set by the menu operation, the outer camera units are added to the active camera units to perform capturing in a wider angle of view. Hence, excellent electronic vibration isolation processing can be performed.

As described above, the power supply unit 205 of each camera unit 101 is controlled in accordance with the state of the camera array 100 so as to switch the active camera units. It is therefore possible to obtain light field information as much as possible and thus obtain suitable multi-view images while suppressing heat generation of the camera units 101 and suppressing thermal noise in the camera array 100. This allows to obtain a captured image having higher quality.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-125712, filed Jun. 3, 2011, which is hereby incorporated by reference herein in its entirety.

What is claimed is:

1. An image capturing apparatus comprising:
a plurality of image capturing units;
a supply unit configured to supply electricity to each image capturing unit;
a determination unit configured to determine a capturing mode and an operation state of the image capturing apparatus;
a decision unit configured to decide an image capturing unit to be activated out of the plurality of image capturing units based on the capturing mode, the operation state, and a capturing distance of an object included in a captured scene;
an estimation unit configured to estimate the capturing distance of the object from image data captured by an activated image capturing unit; and
a control unit configured to, in a case where the operation state transitions from a capturing preparation state to a still image capturing state, control the supply unit to activate the image capturing unit decided to be activated,
wherein the decision unit decides one of the plurality of image capturing units as the image capturing unit to be activated in a case where the operation state is a framing state, and decides the image capturing unit to be activated for capturing the captured scene based on a minimum capturing distance estimated by the estimation unit, and
wherein, in long-term exposure capturing, the activated image capturing unit is not adjacent to other activated image capturing units.

2. The apparatus according to claim 1, wherein the supply unit supplies no electricity to the image capturing units other than the image capturing unit to be activated, or suppresses the electricity supplied to the image capturing units other than the image capturing unit to be activated to a minimum.

3. An image capturing apparatus comprising:
a plurality of image capturing units;
a supply unit which supplies electricity to each image capturing unit;
a temperature sensor which acquires a temperature of the image capturing apparatus;
a determination unit configured to determine a capturing mode and an operation state of the image capturing apparatus;
a decision unit configured to decide an image capturing unit to be activated out of the plurality of image capturing units based on the capturing mode and the operation state; and
a control unit configured to, in a case where the operation state transitions from a live view state to a moving image capturing state, control the supply unit to activate the image capturing unit decided to be activated,
wherein the decision unit decides one of the plurality of image capturing units as the image capturing unit to be activated in a case where the operation state is the live view state, and decides the image capturing unit to be activated in moving image capturing based on the temperature of the image capturing apparatus.

4. The apparatus according to claim 3, further comprising an acquisition unit configured to acquire a focal length of the plurality of image capturing units,
wherein the decision unit decides the image capturing unit to be activated in the moving image capturing based on the temperature of the image capturing apparatus and the focal length.

5. The apparatus according to claim 3, wherein the decision unit decides the image capturing unit to be activated in the moving image capturing based on the temperature of the image capturing apparatus and a set state of electronic vibration isolation processing of the image capturing apparatus.

6. A control method of an image capturing apparatus having a plurality of image capturing units and a supply unit which supplies electricity to each image capturing unit, the method comprising:
using a processor to perform the steps of:
determining a capturing mode and an operation state of the image capturing apparatus;
deciding an image capturing unit to be activated out of the plurality of image capturing units based on the capturing mode, the operation state, and a capturing distance of an object included in a captured scene;
estimating the capturing distance of the object from image data captured by an activated image capturing unit; and
controlling, in a case where the operation state transitions from a capturing preparation state to a still image capturing state, the supply unit to activate the image capturing unit decided to be activated,
wherein, in the deciding step, one of the plurality of image capturing units is decided as the image capturing unit to be activated in a case where the operation state is a framing state, and the image capturing unit to be activated in capturing the captured scene is decided based on a minimum capturing distance estimated in the estimating step, and
wherein, in long-term exposure capturing, the activated image capturing unit is not adjacent to other activated image capturing units.

7. A control method of an image capturing apparatus having a plurality of image capturing units, a supply unit which supplies electricity to each image capturing unit, and a temperature sensor which acquires a temperature of the image capturing apparatus, the method comprising the steps of:
using a processor to perform the steps of:
determining a capturing mode and an operation state of the image capturing apparatus;
deciding an image capturing unit to be activated out of the plurality of image capturing units based on the capturing mode and the operation state; and
controlling, in a case where the operation state transitions from a live view state to a moving image capturing state, the supply unit to activate the image capturing unit decided to be activated,
wherein, in the deciding step, one of the plurality of image capturing units as the image capturing unit to be activated in a case where the operation state is the live view state, and the image capturing unit to be activated in moving image capturing is decided based on the temperature of the image capturing apparatus.

* * * * *